United States Patent
Iwata

(10) Patent No.: US 7,577,259 B2
(45) Date of Patent: Aug. 18, 2009

(54) METHOD AND APPARATUS FOR EXTENDING BAND OF AUDIO SIGNAL USING HIGHER HARMONIC WAVE GENERATOR

(75) Inventor: Kazuya Iwata, Osaka (JP)

(73) Assignee: Panasonic Corporation, Osaka (JP)

( * ) Notice: Subject to any disclaimer, the term of this patent is extended or adjusted under 35 U.S.C. 154(b) by 458 days.

(21) Appl. No.: 10/557,417

(22) PCT Filed: May 14, 2004

(86) PCT No.: PCT/JP2004/006854

§ 371 (c)(1),
(2), (4) Date: Jul. 10, 2006

(87) PCT Pub. No.: WO2004/104987

PCT Pub. Date: Dec. 2, 2004

(65) Prior Publication Data

US 2007/0064956 A1    Mar. 22, 2007

(30) Foreign Application Priority Data

May 20, 2003 (JP) ............................ 2003-141783

(51) Int. Cl.
*H03G 3/00* (2006.01)
*H03G 5/00* (2006.01)
(52) U.S. Cl. .......................... 381/61; 381/98
(58) Field of Classification Search ............... 381/61, 381/98, 94.1–94.3, 56, 101–103
See application file for complete search history.

(56) References Cited

U.S. PATENT DOCUMENTS 5,754,666 A    5/1998  Nakagawa
6,449,519 B1   9/2002  Kuwaoka
6,675,144 B1   1/2004  Tucker et al.
6,711,538 B1   3/2004  Omori et al.
6,829,360 B1*  12/2004 Iwata et al. ................... 381/61
6,836,739 B2   12/2004 Sato (Continued)

FOREIGN PATENT DOCUMENTS

CN        1151077       6/1997

(Continued)

OTHER PUBLICATIONS

Chinese Office Action issued Dec. 26, 2008 in the Chinese Application No. 200480013872.6.

*Primary Examiner*—Xu Mei
(74) *Attorney, Agent, or Firm*—Wenderoth, Lind & Ponack, L.L.P.

(57) ABSTRACT

A higher harmonic wave generator generates a higher harmonic wave of an inputted audio signal having a predetermined band based on the inputted audio signal. Next, a multiplier modulates an amplitude of a generated higher harmonic wave of the audio signal according to a band signal having a predetermined bandwidth so as to generate an amplitude-modulated signal. A digital bandpass filter bandpass-filters a generated amplitude-modulated signal using a predetermined bandpass characteristic, and outputs a resultant signal as a band-extended signal. Further, an adder adds a bandpass-filtered amplitude-modulated signal to the inputted audio signal, and outputs an audio signal including a band-extended signal in an audio signal of an original sound and having an addition result.

23 Claims, 14 Drawing Sheets

U.S. PATENT DOCUMENTS

| | | | |
|---|---|---|---|
| 7,236,839 B2 * | 6/2007 | Fujita et al. | 700/94 |
| 7,356,150 B2 * | 4/2008 | Ejima et al. | 381/61 |
| 7,440,576 B2 * | 10/2008 | Jeon et al. | 381/61 |
| 2002/0121999 A1 | 9/2002 | Akune et al. | |
| 2002/0188365 A1 | 12/2002 | Kuwaoda | |
| 2004/0019492 A1 | 1/2004 | Tucker et al. | |

FOREIGN PATENT DOCUMENTS

| | | |
|---|---|---|
| EP | 0 644 542 | 3/1995 |
| EP | 0 706 299 | 4/1996 |
| EP | 0 795 860 | 9/1997 |
| EP | 0 878 790 | 11/1998 |
| EP | 0 911 826 | 4/1999 |
| EP | 0 994 464 | 4/2000 |
| EP | 1 089 258 | 4/2001 |
| EP | 1 126 620 | 8/2001 |
| EP | 1 298 643 | 4/2003 |
| JP | 9-36685 | 2/1997 |
| JP | 9-258787 | 10/1997 |
| JP | 11-126097 | 5/1999 |
| JP | 2000-172300 | 6/2000 |
| JP | 2001-100773 | 4/2001 |
| JP | 2001-356788 | 12/2001 |
| JP | 2001-525079 | 12/2001 |
| JP | 2002-15522 | 1/2002 |
| JP | 2002-132298 | 5/2002 |
| JP | 2002-175092 | 6/2002 |
| WO | 02/35517 | 5/2002 |
| WO | 02/50814 | 6/2002 |

\* cited by examiner

PROBABILITY DENSITY OF
WHITE NOISE SIGNAL

PROBABILITY DENSITY OF
BELL DISTRIBUTION TYPE NOISE SIGNAL

PROBABILITY DENSITY OF GAUSSIAN DISTRIBUTION TYPE NOISE SIGNAL

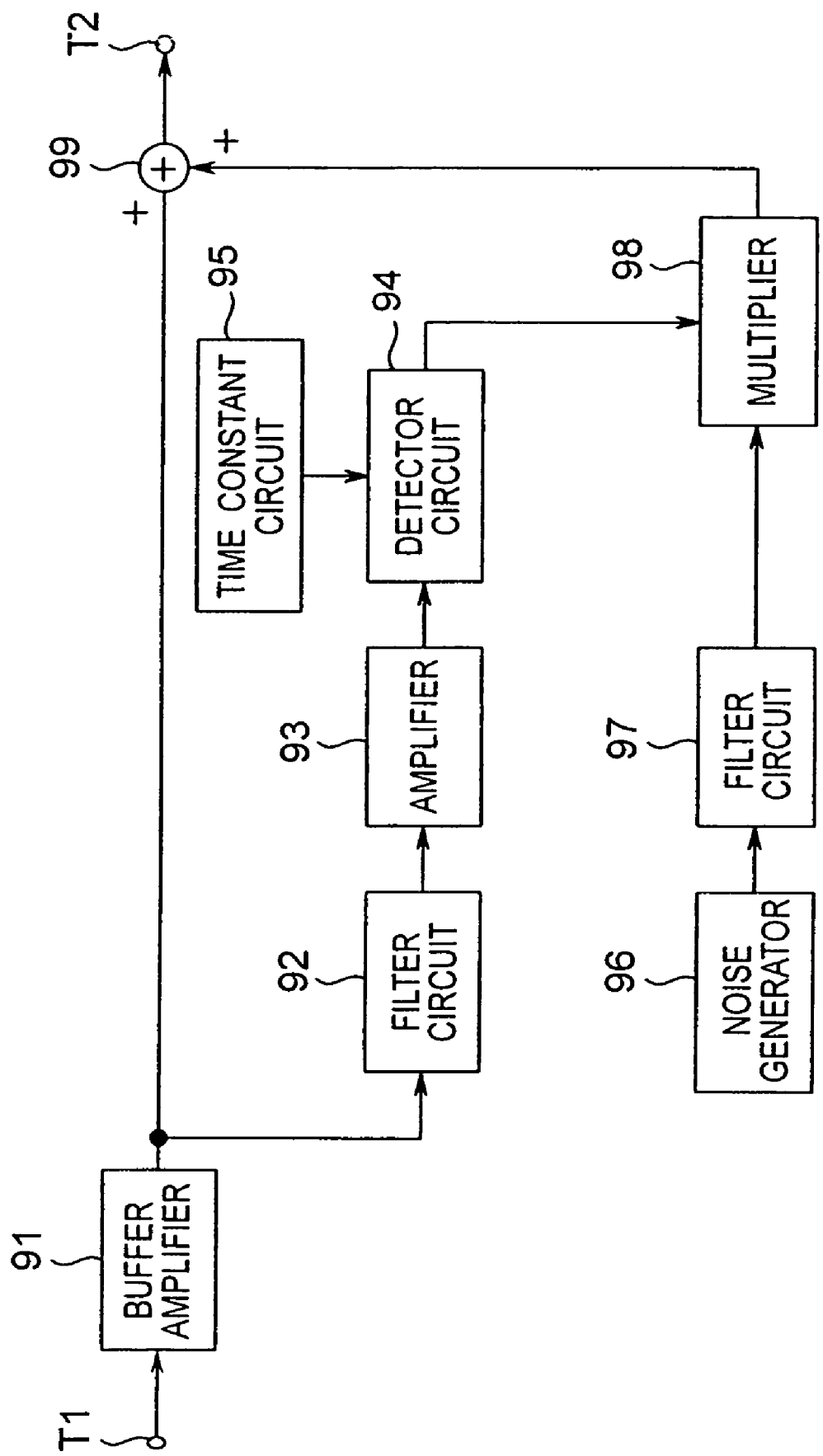

METHOD AND APPARATUS FOR EXTENDING BAND OF AUDIO SIGNAL USING HIGHER HARMONIC WAVE GENERATOR

TECHNICAL FIELD

The present invention relates to a method and an apparatus for extending a band of an audio signal, capable of improving sound quality of an audio signal reproduced by an audio equipment, in particular in a higher frequency range, and capable of reproducing such an audio signal comfortable to the human ear. In particular, the present invention relates to a method and an apparatus for extending a band of an inputted audio signal by performing a digital processing on the inputted audio signal. In addition, the present invention relates to a program that includes steps of the above-mentioned method for extending the band of the audio signal and a computer readable recording medium that stores the program.

BACKGROUND ART

FIG. 3 of Japanese patent laid-open publication No. 9-36685 or FIG. 3 of the corresponding U.S. Pat. No. 5,754,666 discloses an audio signal reproduction apparatus according to a prior art for adding a signal having a frequency spectrum above an upper limit of higher frequency range of a reproduction frequency band or an upper limit of higher frequency range of an audio frequency band to an analog audio reproduced signal. FIG. 16 shows a configuration of the audio signal reproduction apparatus. Referring to FIG. 16, the audio signal reproduction apparatus is constituted by including a buffer amplifier 91, a filter circuit 92, an amplifier 93, a detector circuit 94, a time constant circuit 95, a noise generator 96, a filter circuit 97, a multiplier 98, and an adder 99.

First of all, an audio signal is inputted to the buffer amplifier 91 through an input terminal T1, and then distributed into two signals. One of distributed audio signals is inputted to the adder 99 as it is, and another distributed audio signal is inputted to the filter circuit 92, which is either a high-pass filter or a bandpass filter. The filter circuit 92 bandpass-filters an inputted audio signal, passes only a signal fallen within a specific band, and outputs a resultant signal to the amplifier 93. The amplifier 93 amplifies an inputted audio signal to a predetermined appropriate level, and outputs an amplified audio signal to the detector circuit 94, which includes the time constant circuit 95. The detector circuit 94 detects, for example, an envelope of an inputted audio signal so as to detect an envelope level of the inputted audio signal, and outputs a level signal indicating a detected envelope level to the multiplier 98 as a level control signal for adjusting a level of a noise component added to the original audio signal.

On the other hand, a noise component generated by the noise generator 96 is inputted to the filter circuit 97, which is either a high-pass filter or a bandpass filter. The filter circuit 97 passes a noise component fallen within a frequency band equal to or higher than 20 kHz, and outputs a resultant noise component to the multiplier 98. The multiplier 98 multiplies an inputted noise component by the level control signal outputted from the detector circuit 94 so as to generate a noise component having such a level that is proportional to a level indicated by the level control signal, and outputs a generated noise component to the adder 99.

Further, the adder 99 adds a noise component from the multiplier 98 to the original audio signal from the buffer amplifier 91, generates an audio signal to which the noise component is added, and outputs a noise component-added audio signal from an output terminal T2. In this case, a time constant of the time constant circuit 95 is selected to be equal to a predetermined value so that the noise component generated by the noise generator 96 can be matched to human auditory characteristics and an effect of improvement in sound quality of the audio signal can be increased.

DISCLOSURE OF INVENTION

As described so far, the higher frequency range of the audio signal is extended by adding a random noise whose level is proportional to the output level of the higher frequency range of the original audio signal to the original audio signal. However, the audio signal reproduction apparatus according to the prior art has the following problems.

(1) Since a spectral structure of a higher frequency signal of an added noise component differs from that of a musical sound signal, a user feels incompatibility in sound quality.

(2) In addition, since the audio signal reproduction apparatus according to the prior art is constituted by an analog circuit, the apparatus has the following problems. The variations in components that constitute the analog circuit and temperature characteristics of the components cause variations in performance of the apparatus. As a result, deterioration in sound quality occurs every time when the audio signal passes through the analog circuit. In addition, improvement in accuracy of a filter circuit that constitutes the audio signal reproduction apparatus leads to increase in a size of the filter circuit, resulting in increase in manufacturing cost.

An object of the present invention is therefore to provide a method and an apparatus for extending a band of an audio signal, capable of solving the above-mentioned problems, preventing a user from feeling incompatibility in sound quality, removing deterioration in sound quality, hardly causing variations in performance of the apparatus, and being manufactured at smaller manufacturing cost than that of the apparatus according to the prior art.

Another object of the present invention is to provide a program that includes steps of a method for extending a band of an audio signal, capable of solving the above-mentioned problems, preventing a user from feeling incompatibility in sound quality, removing deterioration in sound quality, hardly causing variations in performance of the apparatus, and being manufactured at smaller manufacturing cost than that of the apparatus according to the prior art, and a computer readable recording medium that stores the program.

According to the first aspect view of the present invention, there is provided a method for extending a band of an audio signal. The method includes a step of, responsive to an inputted audio signal having a predetermined band, generating a higher harmonic wave of the inputted audio signal, and a step of generating a first modulated signal by modulating an amplitude of a generated higher harmonic wave of the audio signal according to a band signal having a predetermined bandwidth. The method further includes a step of bandpass-filtering a generated first modulated signal using a predetermined bandpass characteristic and outputting a resultant first modulated signal, and a step of adding a bandpass-filtered first modulated signal to the inputted audio signal, and outputting an audio signal having an addition result.

The above-mentioned method for extending the band of the audio signal preferably further includes a step of changing a level of the band signal, prior to the amplitude modulating step.

In addition, the above-mentioned method for extending the band of the audio signal preferably further includes a step of changing a level of the bandpass-filtered first modulated signal, prior to the adding step.

Further, the above-mentioned method for extending the band of the audio signal preferably further includes a step of changing a level of the inputted audio signal, adding the audio signal having a changed level to the first modulated signal, and outputting a resultant first modulated signal to the bandpass-filtering step, and the level changing step executed after the amplitude modulating step and prior to the bandpass-filtering step.

In addition, the above-mentioned method for extending the band of the audio signal preferably further includes a step of generating the band signal.

In this case, in the above-mentioned method for extending the band of the audio signal, the band signal generating step preferably includes a step of generating a noise signal having no correlation with the inputted audio signal. Alternatively, in the above-mentioned method for extending the band of the audio signal, the band signal generating step preferably includes a step of generating the band signal based on the inputted audio signal.

In this case, in the former method, the band signal generating step preferably includes a step of generating a predetermined random noise signal, a step of calculating an absolute value of a generated random noise signal, and generating a random noise signal having the absolute value, and a step of low-pass filtering the random noise signal having the absolute value using a predetermined low-pass characteristic, and outputting a resultant random noise signal as the band signal.

In addition, in the latter method, the band signal generating step preferably includes a step of generating a second modulated signal by quantizing the inputted audio signal using either one of a delta-sigma modulation type quantizer and a sigma-delta modulation type quantizer, and generating a quantization noise signal during the quantization, a step of calculating an absolute value of a generated quantization noise signal, and generating a random noise signal having the absolute value, and a step of low-pass filtering the random noise signal having the absolute value using a predetermined low-pass characteristic, and outputting a resultant random noise signal as the band signal.

In addition, in the above-mentioned method for extending the band of the audio signal, the adding step preferably includes a step of adding an audio signal generated by quantizing the inputted audio signal, instead of the inputted audio signal, to the bandpass-filtered first modulated signal, and outputting an audio signal having an addition result.

Further, the above-mentioned method for extending the band of the audio signal preferably further includes a step of changing a cutoff characteristic on a lower frequency side of the bandpass characteristic.

According to the second aspect view of the present invention, there is provided an apparatus for extending a band of an audio signal is provided. The apparatus comprises a higher harmonic wave generating device, an amplitude modulating device, a bandpass filtering device, and an adding device. The higher harmonic wave generating device generates a higher harmonic wave of an inputted audio signal having a predetermined band based on the inputted audio signal. The amplitude modulating device generates a first modulated signal by modulating an amplitude of a generated higher harmonic wave of the audio signal according to a band signal having a predetermined bandwidth. The bandpass filtering device bandpass-filters a generated first modulated signal using a predetermined bandpass characteristic, and outputs a resultant first modulated signal. The adding device adds a bandpass-filtered first modulated signal to the inputted audio signal, outputs an audio signal having an addition result.

The above-mentioned apparatus for extending the band of the audio signal preferably further includes a first level changing device provided at the previous stage of the amplitude modulating device, and the first level changing device changes a level of the band signal.

In addition, the above-mentioned apparatus for extending the band of the audio signal preferably further includes a second level changing device provided at the previous stage of the adding device, and the second level changing device changes a level of the bandpass-filtered first modulated signal.

Further, the above-mentioned apparatus for extending the band of the audio signal preferably further includes a level changing device provided at the subsequent stage of the amplitude modulating device and at the previous stage of the bandpass-filtering device, and the level changing device changes a level of the inputted audio signal, adds the audio signal having a changed level to the first modulated signal, and bandpass-filters a resultant first modulated signal.

Further, the above-mentioned apparatus for extending the band of the audio signal preferably further includes a band signal generating device for generating the band signal.

In this case, in the above-mentioned apparatus for extending the band of the audio signal, the band signal generating device preferably generates a noise signal having no correlation to the inputted audio signal. Alternatively, in the above-mentioned apparatus for extending the band of the audio signal, the band signal generating device generates the band signal based on the inputted audio signal.

In this case, in the former apparatus, the band signal generating device preferably includes a device for generating a predetermined random noise signal, a device for calculating an absolute value of a generated random noise signal, and generating a random noise signal having the absolute value, and a device for low-pass filtering the random noise signal having the absolute value using a predetermined low-pass characteristic, and outputting a resultant random noise signal as the band signal.

In the latter apparatus, the band signal generating device preferably includes a device for quantizing the inputted audio signal using either one of a delta-sigma modulation type quantizer and a sigma-delta modulation type quantizer to generate a second modulated signal, and for generating a quantization noise signal during the quantization, a device for calculating an absolute value of a generated quantization noise signal, and generating a random noise signal having the absolute value, and a device for low-pass filtering the random noise signal having the absolute value using a predetermined low-pass characteristic, and outputting a resultant random noise signal as the band signal.

In addition, in the above-mentioned apparatus for extending the band of the audio signal, the adding device preferably adds an audio signal generated by quantizing the inputted audio signal, instead of the inputted audio signal, to the bandpass-filtered first modulated signal, and outputs an audio signal having an addition result.

Further, the above-mentioned apparatus for extending the band of the audio signal preferably further includes a device for changing a cutoff characteristic on a lower frequency side of the bandpass characteristic of the bandpass-filtering device.

According to the third aspect view of the present invention, there is provided a program that includes the respective steps of the above-mentioned method for extending the band of the audio signal.

According to the fourth aspect view of the present invention, there is provided a computer readable recording medium that stores the above-mentioned program.

Therefore, according to the method or apparatus for extending the band of the audio signal according to the present invention, a band-extended signal, which is obtained by modulating an amplitude of a carrier wave that is the higher harmonic wave of the inputted audio signal according to the band signal, is added to the inputted audio signal. Accordingly, it is possible to easily generate an audio signal having an extended audio band as compared with the prior art. In addition, the band-extended signal obtained by the amplitude modulation changes according to a level of an original sound and keeps its spectral continuity. Accordingly, the method or apparatus according to the present invention exhibits such an advantageous effect that the higher frequency component of the band-extended signal sounds not artificial but natural relative to the original sound.

BRIEF DESCRIPTION OF DRAWINGS

FIG. 16 is a block diagram showing a configuration of an apparatus for extending a band of an audio signal according to the prior art.

BEST MODE FOR CARRYING OUT THE INVENTION

Preferred embodiments according the present invention will be described below with reference to the drawings. In the attached drawings, components similar to each other are denoted by the same numerical references, respectively, and will not be repeatedly described in detail.

First Preferred Embodiment

Figure 1:
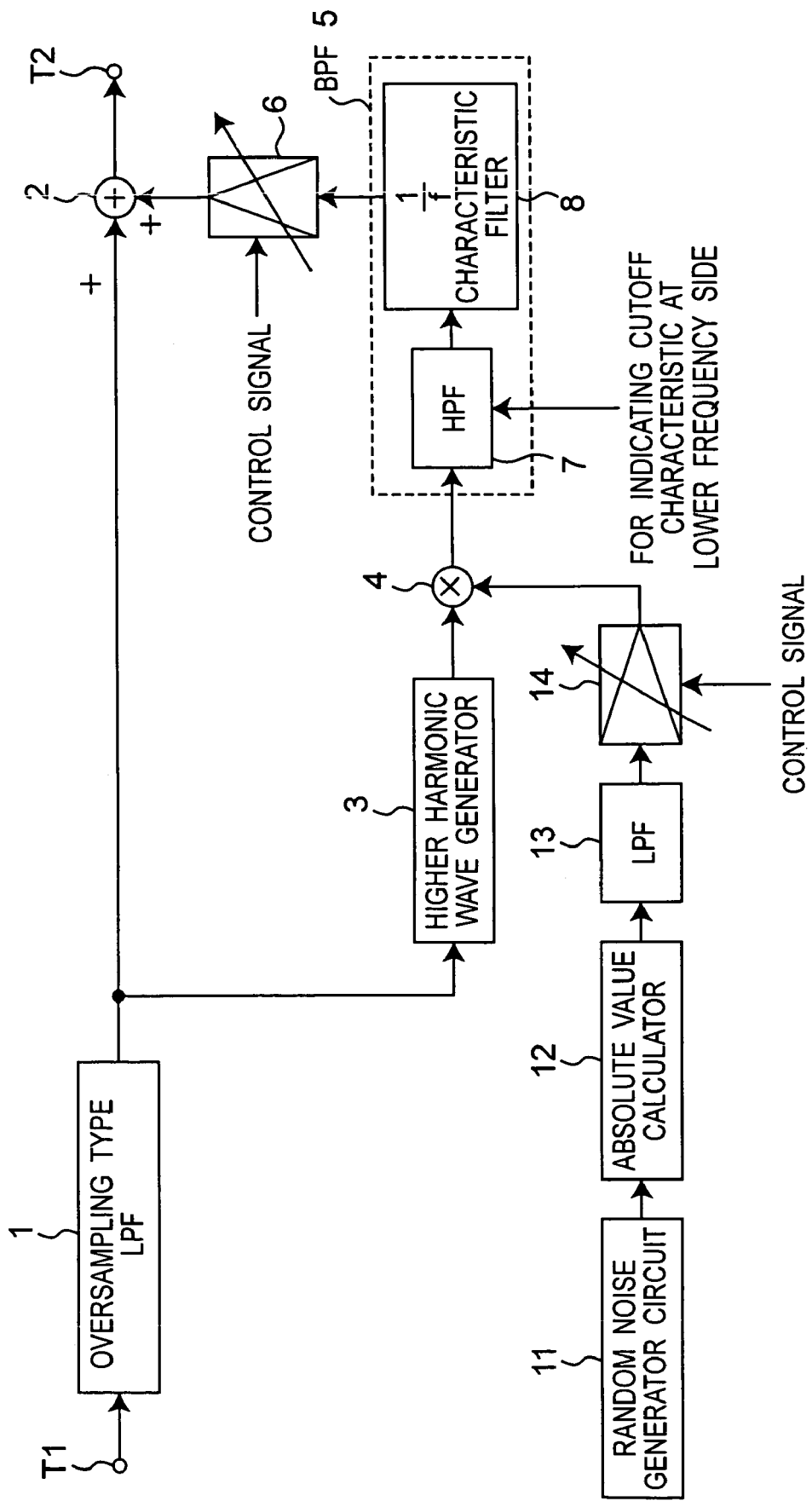
FIG. 1 is a block diagram showing a configuration of an apparatus for extending a band of an audio signal according to a first preferred embodiment of the present invention.

FIG. 1 is a block diagram showing a configuration of an apparatus for extending a band of an audio signal according to a first preferred embodiment of the present invention. The audio signal band extending apparatus according to the first preferred embodiment is such a digital signal processing circuit that is inserted between an input terminal T1 and an output terminal T2. The audio signal band extending apparatus is constituted by including an oversampling type low-pass filter (oversampling type LPF) 1, an adder 2, a higher harmonic wave generator 3, a multiplier 4, a digital bandpass filter (BPF) 5, and a variable amplifier 6. The audio signal band extending apparatus is also constituted by further including a random noise generator circuit 11, an absolute value calculator 12, a digital low-pass filter (LPF) 13, and a variable amplifier 14. In this case, the digital bandpass filter 5 is constituted by including a digital high-pass filter (HPF) 7 and a (1/f) characteristic filter 8 which are connected in cascade to each other.

Figure 2:
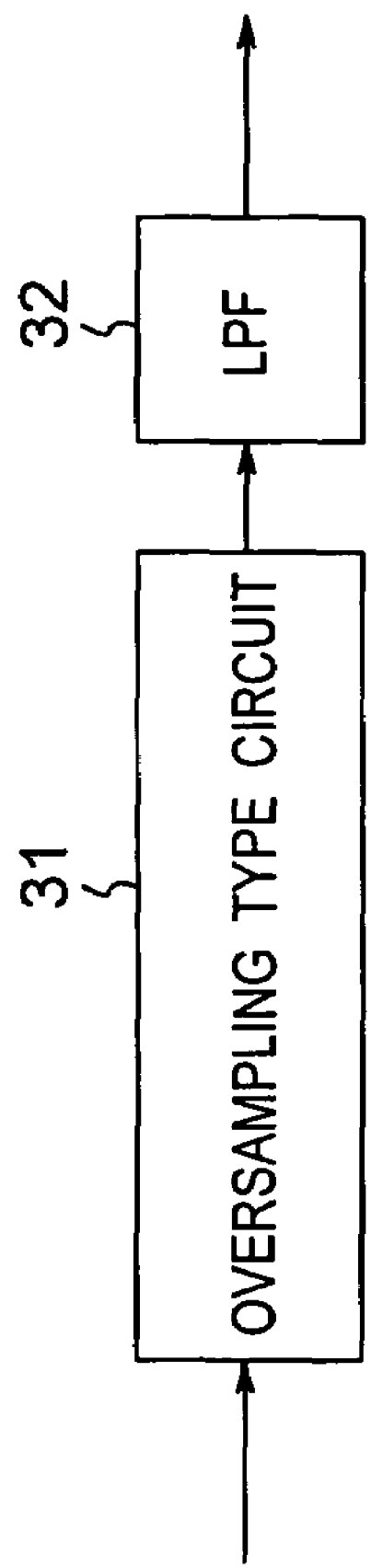
FIG. 2 is a block diagram showing an internal configuration of an oversampling type low-pass filter 1 shown in FIG. 1.

Referring to FIG. 1, a digital audio signal is inputted to the oversampling type low-pass filter 1 via the input terminal T1. This digital audio signal is reproduced from, for example, a compact disk (CD), and in this case, the signal has a sampling frequency fs of 44.1 kHz and a word length of 16 bits. As shown in FIG. 2, the oversampling type low-pass filter 1 is constituted by including an oversampling circuit 31 and a digital low-pass filter (LPF) 32. The oversampling type low-pass filter 1 is such a digital filter circuit that multiplies the sampling frequency fs of the digital audio signal inputted via the input terminal T1 by "p" (where "p" is a positive integer equal to or greater than 2), and attenuates a signal fallen within unnecessary band that extends from a frequency of fs/2 to a frequency of pfs/2 by 60 dB or larger.

Figure 3:
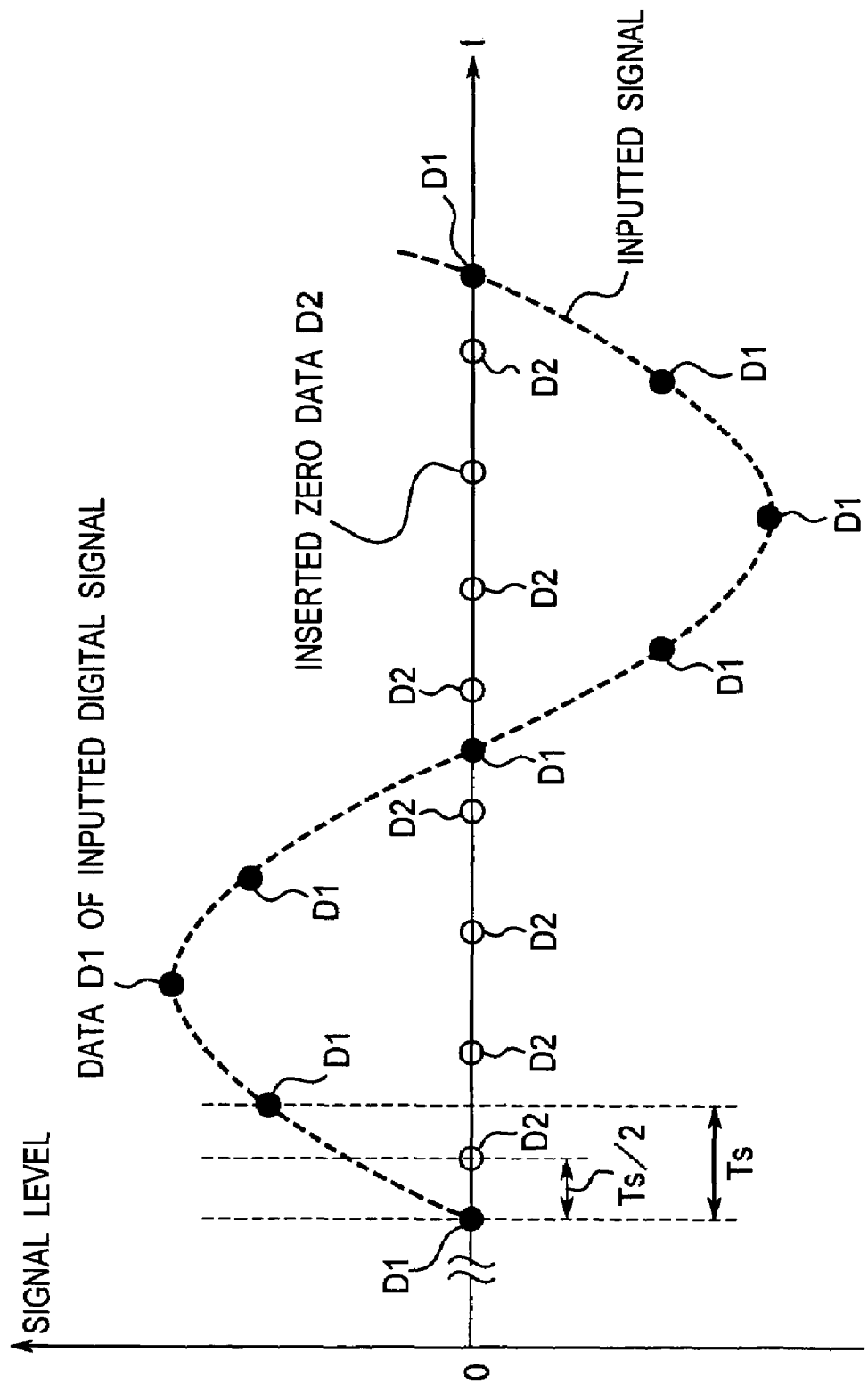
FIG. 3 is a signal waveform view showing an operation of an oversampling circuit 31 shown in FIG. 2.

When the "p" is, for example, 2, the digital audio signal having the sampling frequency fs (having a sampling cycle Ts=1/fs) is inputted to the oversampling circuit 31. As shown in FIG. 3, the oversampling circuit 31 executes an oversampling processing on data D1 of an inputted digital audio signal by inserting "zero" data D2 into intermediate positions (relative to time axis) of respective two D1 data adjacent to each other at the sampling cycle Ts so as to interpolates the data D1, and converts the inputted digital audio signal into a digital audio signal having a sampling frequency 2 fs (having a sampling cycle Ts/2). Then, the oversampling circuit 31 outputs a resultant digital audio signal to the digital low-pass filter 32. The digital low-pass filter 32 has the following:

(a) a passband that extends from frequency of 0 to 0.45 fs;

(b) a stop band that extends from frequency of 0.45 fs to fs; and (c) an attenuation amount of equal to or larger than 60 dB at a frequency equal to or higher than fs. The digital low-pass filter 32 limits a band of an inputted digital audio signal so as to remove an aliasing noise generated by the oversampling processing by low-pass filtering the inputted digital audio signal, and passes only an effective band (that extends from frequency of 0 to 0.45 fs) which the inputted digital audio signal has substantially. Then, the digital low-pass filter 32 outputs a resultant signal to the adder 2 shown in FIG. 1 and an absolute value calculator 51 (FIG. 4) of the higher harmonic wave generator 3.

Figure 4:
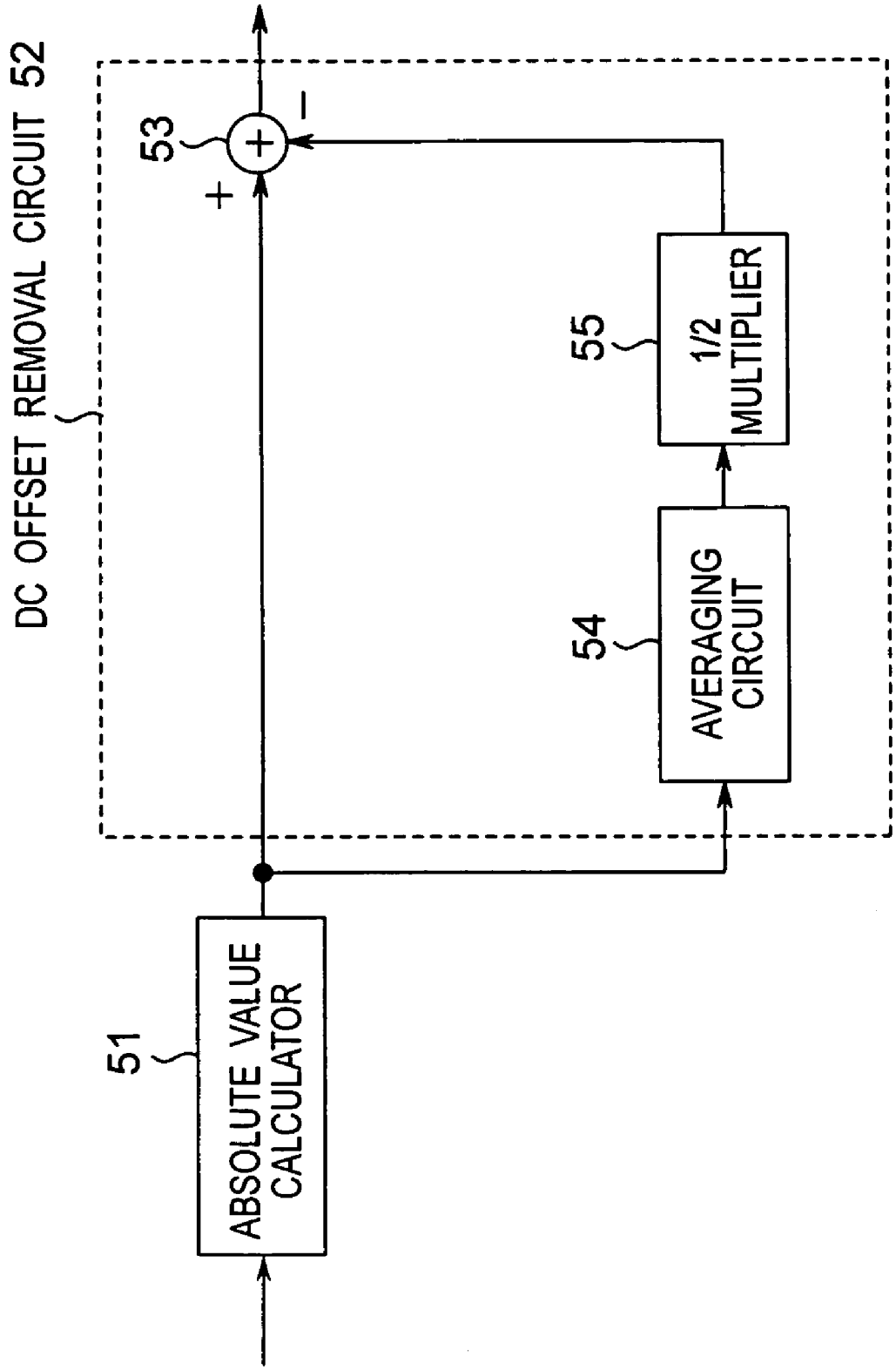
FIG. 4 is a block diagram showing an internal configuration of a higher harmonic wave generator 3 shown in FIG. 1.

Next, the higher harmonic wave generator 3 shown in FIG. 1 is a nonlinear processing circuit that has a nonlinear input and output characteristic. The higher harmonic wave generator 3, by executing a nonlinear processing to an inputted digital audio signal, distorts the digital audio signal so as to generate a higher harmonic wave component signal. Then, the higher harmonic wave generator 3 outputs a digital audio signal including the higher harmonic wave component signal to the multiplier 4. The higher harmonic wave generator 3 is constituted by including, for example, the absolute value calculator 51 and a DC offset removal circuit 52 as shown in FIG. 4. In this case, the DC offset removal circuit 52 is constituted by including a subtracter 53, an averaging circuit 54, and a (½) multiplier 55.

Referring to FIG. 4, the absolute value calculator 51 executes the nonlinear processing such as a full-wave rectification process on an inputted digital audio signal, and then outputs a digital audio signal which has been subjected to the nonlinear processing to the subtracter 53 and the averaging circuit 54 provided in DC offset removal circuit 52. The absolute value calculator 51 outputs a signal having a positive amplitude as it is, whereas the absolute value calculator 51 converts a signal having a negative amplitude into a signal having a positive amplitude that is the same as an absolute value of the negative amplitude, and outputs a resultant signal. Due to this, the higher harmonic wave components are generated at portions at which the signal having the negative amplitude is folded toward a positive side with a boundary of the zero level. Next, the averaging circuit 54 is constituted by including such a low-pass filter that has a cutoff frequency of much lower than the sampling frequency fs, for example, about 0.0001 fs. The averaging circuit 54 calculates a time-averaged value of an amplitude of an inputted digital audio signal within a predetermined time interval (for example, a time interval sufficiently longer than the sampling cycle Ts), and outputs a digital signal having the time averaged value to the (½) multiplier 55. Then, the (½) multiplier 55 multiplies an inputted digital signal by ½, and outputs a digital signal having a value of a multiplication result to the subtracter 53 as a digital signal indicating a DC offset amount. Further, the subtracter 53 subtracts a digital signal outputted from the (½) multiplier 55 from a digital audio signal outputted from the absolute value calculator 51 so as to remove a DC offset.

In the present preferred embodiment, the digital signal inputted via the input terminal T1 is a signal based on the zero level. Accordingly, it is necessary to set each of output digital signals from respective circuits shown in FIG. 1 and a digital signal from the output terminal T2 to be a signal based on the zero level. However, even if a digital signal inputted to the higher harmonic wave generator 3 is a signal based on the zero level, a level of the signal is converted into a positive level by the absolute value calculator 51 for performing the nonlinear processing. As a result, the DC offset is generated. Accordingly, an average value of a digital signal outputted from the absolute value calculator 51 is calculated by the averaging circuit 54, and a half of the average value is subtracted from the digital signal outputted from the absolute value calculator 51 so as to remove the DC offset.

Then, as shown in FIG. 1, a digital signal including the higher harmonic wave component generated by the higher harmonic wave generator 3 based on a level of an inputted digital audio signal (i.e., the higher harmonic wave component having a level corresponding to that of the inputted digital audio signal so as to be substantially proportional thereto) is outputted to the multiplier 4.

In addition, the random noise generator circuit 11 shown in FIG. 1 generates a digital audio signal having a band that extends from frequency of 0 to pfs/2 and a random amplitude level relative to the time axis, i.e., generates a random noise signal which is such a dither signal that is generated without any correlation with the digital audio signal inputted via the input terminal T1, and outputs a generated random noise signal to the absolute value calculator 12. Next, the absolute value calculator 12 is such a calculator that executes an absolute value calculation processing on an inputted random noise signal. The absolute value calculator 12 outputs a signal having a positive amplitude to the digital low-pass filter 13 as it is, whereas the absolute value calculator 12 converts a signal having a negative amplitude into a signal having a positive amplitude that is the same as an absolute value of the negative amplitude, and outputs a resultant signal to the digital low-pass filter 13. It is noted that the absolute value calculator 12 is provided so that the multiplier 4 multiplies the higher harmonic wave component outputted from the higher harmonic wave generator 3 by a random noise signal having a predetermined sign regardless of change in the sign of the random noise signal. Further, the digital low-pass filter 13, which has a maximum cutoff frequency within a range from 100 Hz to 20 kHz, preferably from 1 kHz to 2 kHz, low-pass filters an inputted random noise signal, which has been subjected to the absolute value calculation, and outputs a resultant signal to the multiplier 4 via the variable amplifier 14.

In this case, the variable amplifier 14 is a level control circuit. The variable amplifier 14 changes a level (amplitude value) of an inputted digital signal by an amplification ratio (which is set for a positive amplification processing but may be set for a negative amplification or an attenuation processing) based on a control signal, and outputs a level-changed digital signal to the multiplier 4. In addition, the variable amplifier 14 is used to relatively adjust a level of a digital audio signal from the higher harmonic wave generator 3 and a level of a noise signal from the digital low-pass filter 13. This adjustment is preferably set so that an amplitude modulation at the multiplier 4 is performed at a modulation factor of, for example, 80% to 100%.

Figure 5:
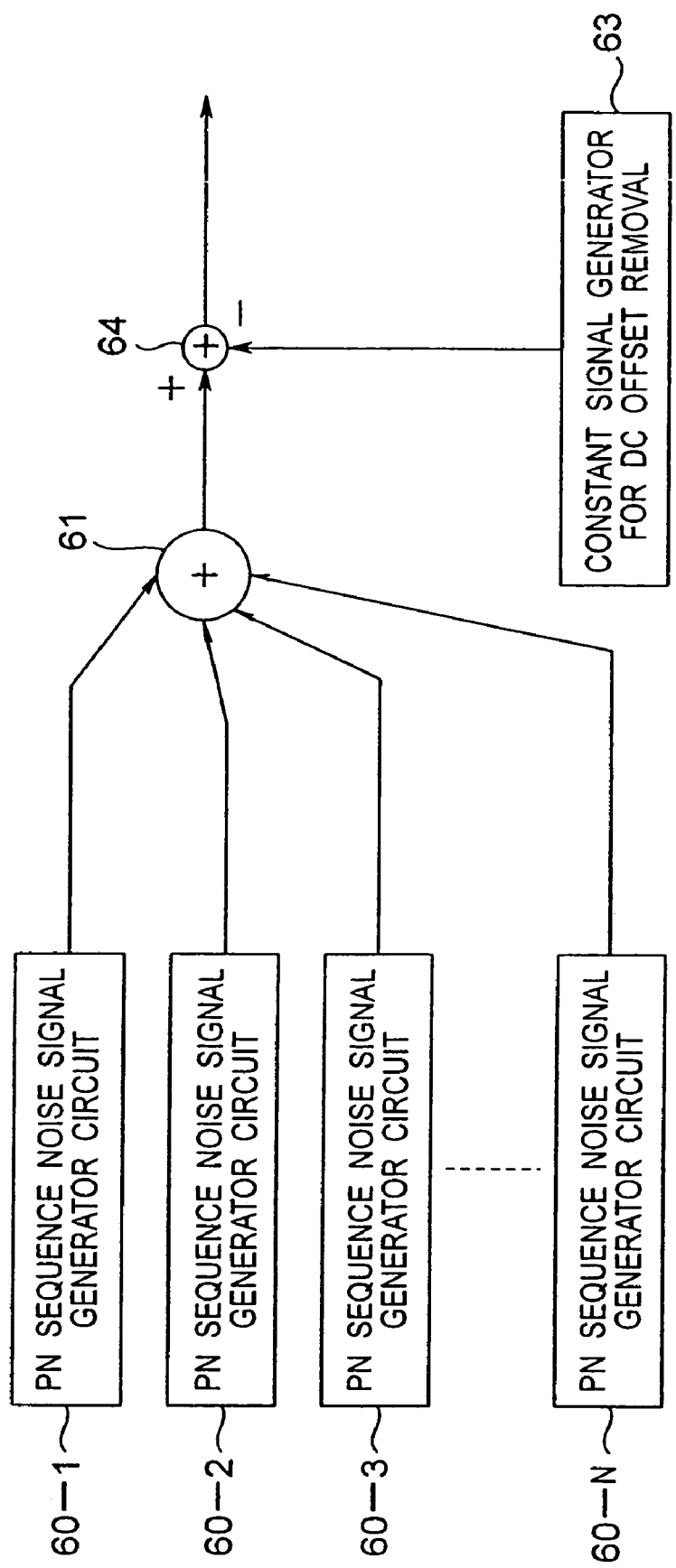
FIG. 5 is a block diagram showing an internal configuration of a random noise generator circuit 11 shown in FIG. 1.

Concretely speaking, the random noise generator circuit 11 shown in FIG. 1 is constituted as shown in, for example, FIG. 5. Referring to FIG. 5, the random noise generator circuit 11 is constituted by including a plurality of "N" pseudo noise sequence noise signal generator circuits (referred to as PN sequence noise signal generator circuits hereinafter) 60-$n$ (n=1, 2, . . . , N), an adder 61, a constant signal generator for DC offset removal 63, and a subtracter 64. In this case, the respective PN sequence noise signal generator circuits 60-$n$ have independent initial values. The respective PN sequence noise signal generator circuits 60-$n$ generate pseudo noise (PN) signals having uniformly random amplitude levels, for example, M sequence noise signals, and output generated PN signals to the adder 61. Next, the adder 61 adds up a plurality of PN signals outputted from the PN sequence noise signal generator circuits 60-1 to 60-N so as to obtain a PN signal, and outputs the PN signal having an addition result to the subtracter 64. On the other hand, the constant signal generator for DC offset removal 63 generates a constant signal for DC offset removal, which has a sum of time averaged values of the PN signals from a plurality of "N" PN sequence noise signal generator circuits 60-1 to 60-N, and outputs a generated signal to the subtracter 64. The subtracter 64 generates and outputs a dither signal without a DC offset by subtracting the constant signal for DC offset removal from a sum of the PN signals.

Figure 6:
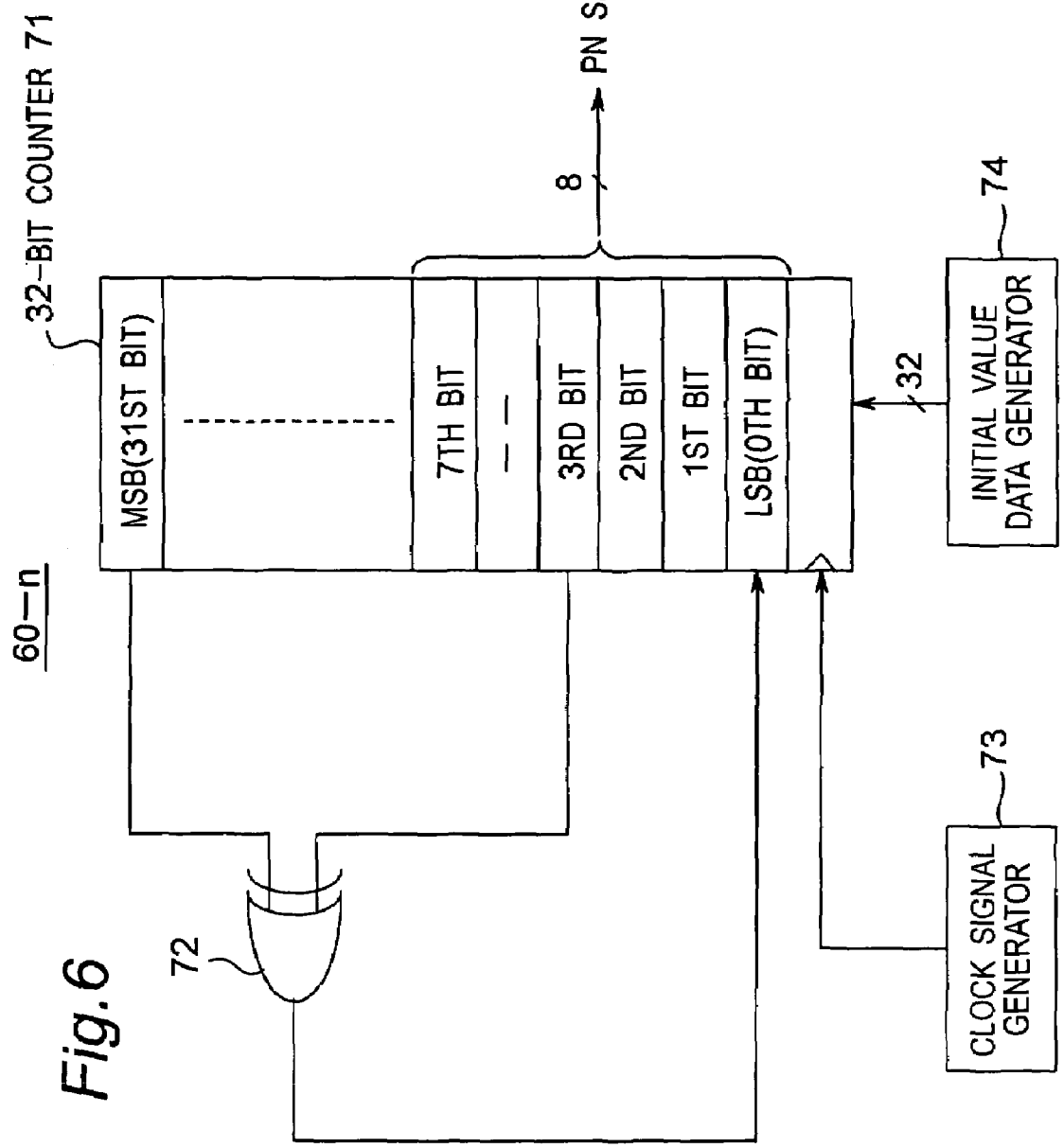
FIG. 6 is a block diagram showing an internal configuration of a PN sequence noise signal generator circuit 60-$n$ (n=1, 2, . . . , N) shown in FIG. 5.

In this case, as shown in FIG. 6, each of PN sequence noise signal generator circuits 60-$n$ ($n$=1, 2, . . . , N) is constituted by including a 32-bit counter 71, an exclusive-OR gate 72, a clock signal generator 73, and an initial value data generator 74. An initial value of 32 bits is set into the 32-bit counter 71 by the initial value data generator 74. Initial values of 32 bits for the respective PN sequence noise signal generator circuits 60-$n$ are different from each other, and then the 32-bit counter 71 counts so as to increment by one according to a clock signal generated by the clock signal generator 73. Among data of 32 bits (including data of 0th bit to data of 31st bit) of the 32-bit counter 71, one-bit data of most significant bit (MSB; 31st bit) and one-bit data of the 3rd bit are inputted to an input terminal of the exclusive-OR gate 72. The exclusive-OR gate 72 sets one-bit data of a calculated exclusive logical sum to a least significant bit (LSB) of the 32-bit counter 71. Finally, data of lower eight bits of the 32-bit counter 71 is outputted as a PN sequence noise signal. By thus constituting the PN sequence noise signal generator circuits 60-$n$, PN sequence noise signals outputted from the respective PN sequence noise signal generator circuits 60-$n$ become the eight-bit PN sequence noise signals independent of one another.

In the example shown in FIG. 6, the PN sequence noise signal generator circuits 60-$n$ are constituted as described above so as to generate the eight-bit PN sequence noise signals independent of one another. However, the present invention is not limited to this. The PN sequence noise signal generator circuits 60-$n$ may be constituted as follows.

(1) The bit locations of eight-bit in respective 32-bit counters 71, from which the PN sequence noise signals are taken out, are set to be different from each other. Namely, the PN sequence noise signal generator circuit 60-1 takes out an eight-bit PN sequence noise signal from the least significant eight bits, the PN sequence noise signal generator circuit 60-2 takes out a PN sequence noise signal from eight bits right on the least significant eight bits, and the subsequent PN sequence noise signal generator circuits take out PN sequence noise signals in a manner similar to above.

(2) Instead, the bit locations of the respective 32-bit counters 71, from which one-bit data inputted to corresponding exclusive-OR gates 72 are taken out, are set to be different from each other.

(3) Alternatively, at least two of the example shown in FIG. 6, a modified example as described in (1), and a modified example as described in (2) are combined.

Figure 7:
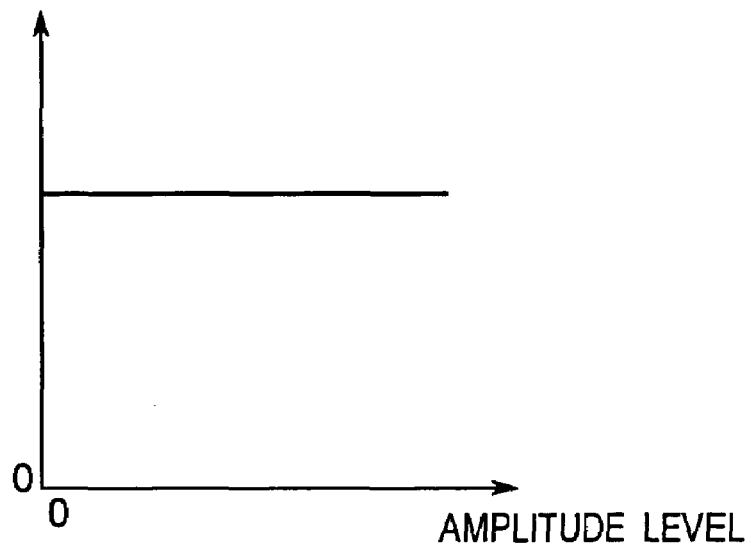
FIG. 7 is a graph showing a function of a probability density relative to an amplitude level of a white noise signal generated by one example of the PN sequence noise signal generator circuit 60-$n$ (n=1, 2, . . . , N) shown in FIG. 6.
Figure 8:
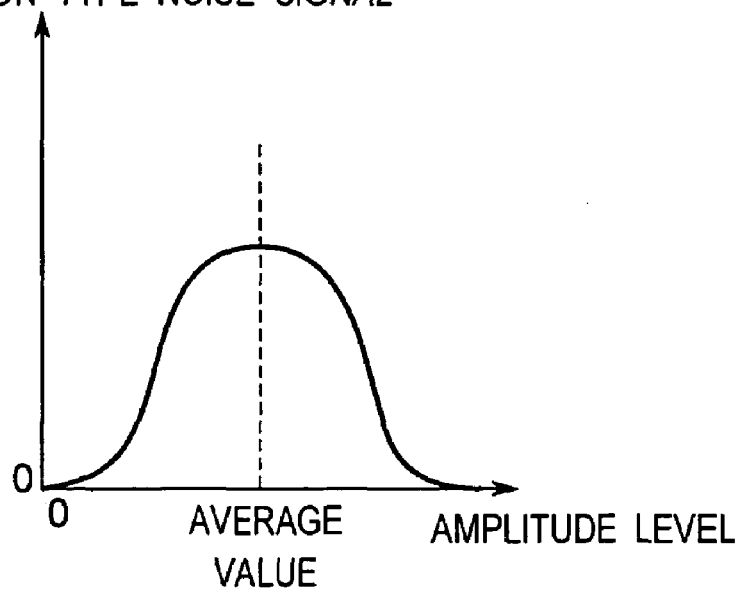
FIG. 8 is a graph showing a function of a probability density relative to an amplitude level of a bell distribution type noise signal generated by another example of the PN sequence noise signal generator circuit 60-$n$ (n=1, 2, . . . , N) shown in FIG. 6.
Figure 9:
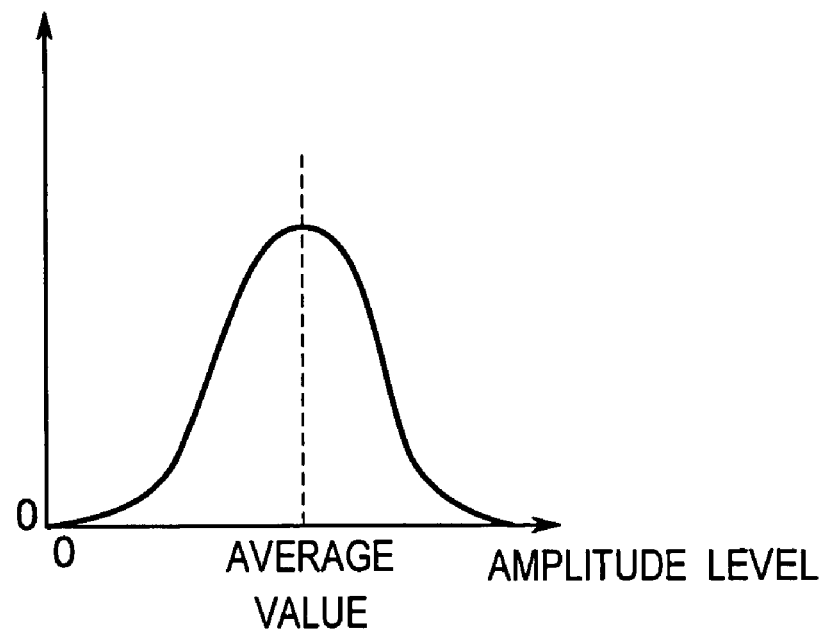
FIG. 9 is a graph showing a function of a probability density relative to an amplitude level of a Gaussian distribution type noise signal generated by a further example of the PN sequence noise signal generator circuit 60-$n$ (n=1, 2, . . . , N) shown in FIG. 6.

By adding up a plurality of PN sequence noises independent of one another, a PN sequence noise signal having a probability density relative to an amplitude level can be generated as shown in FIGS. 7, 8, and 9. If "N" is 1, for example, a white noise signal generally having such a probability density that is uniformly distributed relative to the amplitude level can be generated as shown in FIG. 7. In addition, a Gaussian distribution has a dispersion of $1/12$ according to the central limit theorem. Accordingly, if "N" is 12, by adding up the PN sequence noise signals from the respective PN sequence noise signal generator circuits 60-$n$ that generate twelve uniformly random numbers, a Gaussian distribution type noise signal generally having a probability density of the Gaussian distribution relative to the amplitude level can be generated as shown in FIG. 9. Further, if "N" is 3, a bell distribution type (hanging bell type) noise signal having a probability density of a bell distribution or a hanging bell distribution similar to the Gaussian distribution and having a slightly greater dispersion than that of the Gaussian distribution, relative to the amplitude level can be generated as shown in FIG. 8. As described so far, by constructing circuits as shown in FIGS. 5 and 6, and generating a noise signal shown in, for example, FIG. 8 or 9, a dither signal similar to a natural sound or a musical sound signal can be generated using such a circuit that is small in size.

Referring back to FIG. 1, the multiplier 4 is a calculator for amplitude modulation. The multiplier 4 modulates an amplitude of a carrier wave, which is a digital audio signal of the higher harmonic wave component outputted from the higher harmonic wave generator 3, according to a noise signal which is outputted from the variable amplifier 14. A band of the noise signal is limited, and the noise signal has no correlation with the original sound. Namely, by multiplying these two signals together, the multiplier 4 generates a digital band-extended signal which includes a plurality of carrier waves of, for example, the digital audio signals of the higher harmonic wave components and a plurality of amplitude-modulated signals having band components on both sides of the noise signal, band of which is limited to a band centered with respect to the carrier waves by the digital low-pass filter 13. In addition, the digital band-extended signal has a level corresponding to that of the digital audio signal inputted via the input terminal T1. Then, the multiplier 4 inputs a generated digital band-extended signal to the digital high-pass filter 7 provided within the digital bandpass filter 5.

Figure 10:
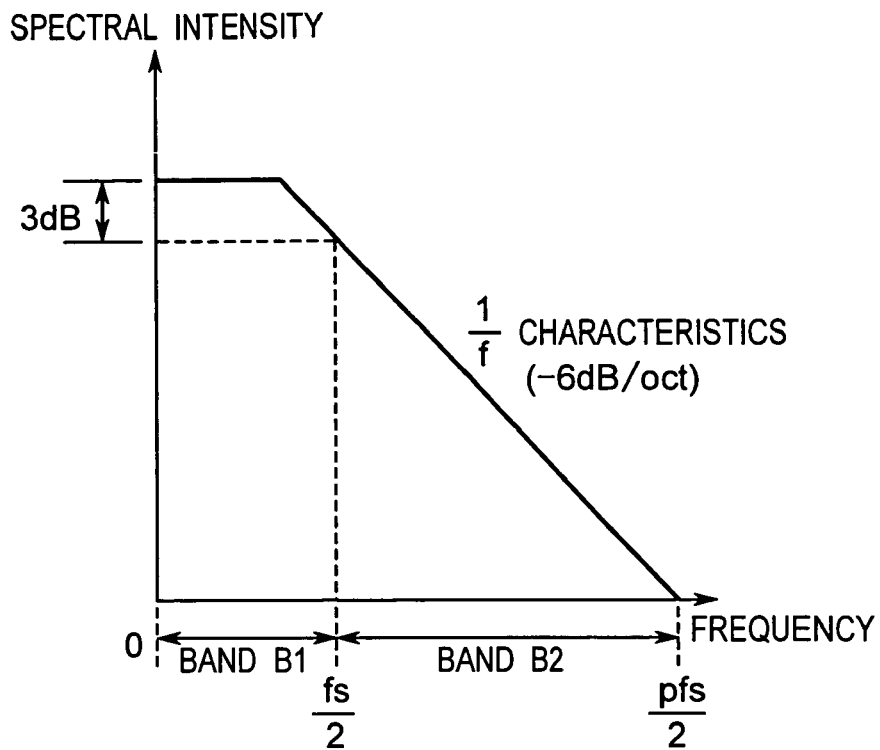
FIG. 10 is a spectral view showing a frequency characteristic of a (1/f) characteristic filter 8 shown in FIG. 1.

As shown in FIG. 1, the digital bandpass filter 5 is configured so that the digital high-pass filter 7 and the (1/f) characteristic filter 8, which is the digital low-pass filter, are connected in cascade to each other. When the inputted digital audio signal is, for example, an uncompressed digital signal outputted from a CD player or the like, the digital bandpass filter 5 preferably has the following specifications:

(1) A cutoff frequency $f_{LC}$ on a lower frequency side is about fs/2;

(2) A cutoff characteristic on the lower frequency side is an attenuation amount equal to or larger than 80 dB at a frequency fs/4. The attenuation amount is close to an SN ratio based on a quantization number of the original sound. When the quantization number of the original sound is, for example, 16 bits, a theoretical SN is 98 dB. Accordingly, the digital bandpass filter 5 preferably has the attenuation amount equal to or larger than 80 to 100 dB. It is noted that softer sound quality is obtained as the cutoff characteristic on the lower frequency side is slower, and that sharper sound quality tendency is obtained as the cutoff frequency on the lower frequency side is sharper. In the latter case, a band extension effect can be exhibited without damaging sound quality tendency of the original sound. Accordingly, it is preferable that the cutoff characteristic on the lower frequency side of the digital low-pass filter 7 can be selectively changed over between, for example, the above-stated two characteristics according to a user's command signal from an external controller;

(3) A cutoff frequency $f_{HC}$ on a higher frequency side is about fs/2; and (4) A cutoff characteristic on the higher frequency side is −6 dB/oct (See FIG. 10).

As shown in FIG. 10, the (1/f) characteristic filter 8 is a so-called (1/f) characteristic low-pass filter that possesses such an attenuation characteristic that an inclination of −6 dB/oct in a band B2 that extends from frequency of fs/2 to p~fs/2, where the band B2 is higher that a band B1 that extends from frequency of 0 to fs/2. It is noted that "p" denotes an oversampling ratio, for example, an integer equal to or greater than 2 and equal to or smaller than about 8.

The digital bandpass filter 5 bandpass-filters an inputted digital signal, and outputs a bandpass-filtered digital band-extended signal to the adder 2 via the variable amplifier 6. Further, the adder 2 adds a digital band-extended signal from the variable amplifier 6 to a low-pass filtered digital audio signal from the oversampling type low-pass filter 1 so as to obtain a digital audio signal having an addition result. The digital audio signal is such a signal that the digital band-extended signal is included in the digital audio signal of the original sound. The adder 2 outputs the digital audio signal via the output terminal T2.

In this case, the variable amplifier 6 is a level control circuit similarly to the variable amplifier 14. The variable amplifier 6 changes a level (amplitude value) of an inputted digital signal by an amplification ratio (which is set for a positive amplification processing but may be set for a negative amplification or an attenuation processing) based on a control signal, and outputs a level-changed digital signal to the adder 2. The variable amplifier 6 is used to relatively adjust the level of the digital audio signal from the oversampling type low-pass filter 1 and the level of the digital band-extended signal from the digital bandpass filter 5. This adjustment is preferably set so that the levels of these two signals substantially coincide with each other, i.e., set so as to keep a spectral continuity, at the frequency of, for example, fs/2 in the adder 2.

As described so far, according to the first preferred embodiment of the present invention, the higher harmonic wave component or the dither signal is generated having the same spectral structure as that of the musical sound signal (that is, having a generation mechanism substantially analogous to that of the natural sound by forming a dither signal generation frequency to have a generally Gaussian distribution or the bell distribution) in a band equal to or higher than that of an inputted digital audio signal. Further, a band-extended signal is generated by modulating the amplitude of the carrier wave, which is the digital signal of the generated higher harmonic wave component which is generated according to a higher frequency spectral intensity of the inputted digital audio signal, in accordance with the noise signal such as the dither signal, which is the band signal having a predetermined bandwidth. Then the band-extended signal is added to the inputted digital audio signal. Accordingly, it is possible to easily generate a digital audio signal having an extended audio band as compared with the prior art. In addition, since the band-extended signal obtained by the amplitude modulation as described so far changes according to the level of the original sound and keeps its spectral continuity, the present invention has such a characteristic advantage that the higher frequency component of the band-extended signal sounds is not artificial but natural relative to the original sound.

Further, the signal processing performed by the audio signal band extending apparatus according to the present preferred embodiment are all digital signal processing. Accordingly, variations in performance do not occur due to variations in components that constitute circuits, and temperature characteristic. In addition, deterioration in sound quality does not occur when the audio signal passes through each of the circuits. Further, even if the accuracy of each filter that constitutes the same circuit is improved, size of circuits is not made large and manufacturing cost is not increased, in a manner different from that of an apparatus constituted by analog circuits.

In the preferred embodiment stated above, the absolute value calculator 51 shown in FIG. 4 which is a full-wave rectifier circuit is employed to constitute the higher harmonic wave generator 3. However, the present invention is not limited to this. A half-wave rectifier circuit that outputs only a positive part of the inputted digital audio signal and outputs a negative part of the inputted digital audio signal after setting the negative part to the zero level may be employed instead of the absolute value calculator 51.

Figure 11:
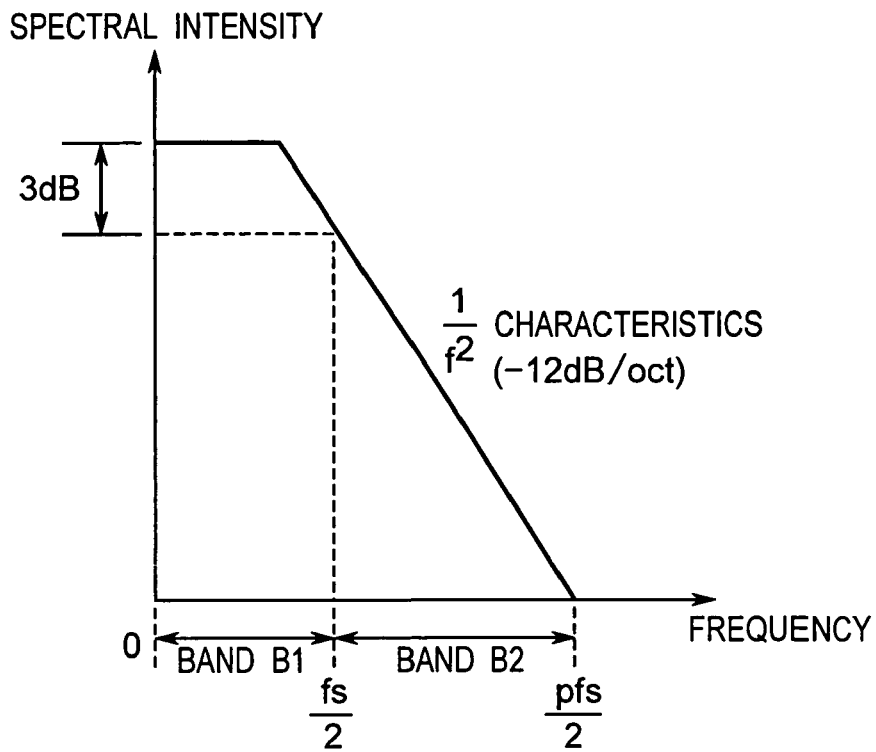
FIG. 11 is a spectral view showing a frequency characteristic of a (1/f$^2$) characteristic filter instead of the (1/f) characteristic filter 8 shown in FIG. 1.

In the preferred embodiment stated above, the (1/f) characteristic filter 8 is employed. However, the present invention is not limited to this. The apparatus may include a $(1/f^2)$ characteristic filter having an attenuation characteristic shown in FIG. 11 instead of the (1/f) characteristic filter 8. As shown in FIG. 11, the $(1/f^2)$ characteristic filter is a so-called $(1/f^2)$ characteristic low-pass filter that exhibits the attenuation characteristic having an inclination of −12 dB/oct in the band B2 that extends from frequency of fs/2 to p·fs/2, where the band B2 is higher than the band B1 that extends from frequency of 0 to fs/2.

In the preferred embodiment stated above, the preferable specifications of the digital bandpass filter 5 when the inputted digital audio signal is the uncompressed digital signal from the CD player or the like have been described. When the inputted digital audio signal is a digital signal (referred to as an MD signal hereinafter) from a MD (MiniDisc) player or a digital audio signal (referred to as an AAC signal hereinafter) compression-coded by AAC (Advanced Audio Coding) for use in an audio signal conforming to MPEG-4, the cutoff frequency fs/2 of the digital bandpass filter 5 on the lower frequency side and on the higher frequency side is preferably set to an upper limit frequency of a reproduction band of the compressed audio signal. In this case, the sampling frequency fs of the MD signal and the AAC signal are, for example, 44.1 kHz or 48 kHz. The sampling frequency fs of a half-rate signal of the AAC signal is 22.05 kHz or 24 kHz. In the former case, the upper limit frequency of the reproduction band is about 10 kHz to 18 kHz. In the latter case, the upper limit frequency of the reproduction band is about 5 kHz to 9 kHz.

In the preferred embodiment stated above, the random noise signal is generated by the random noise generator circuit 11. However, the present invention is not limited to this. The random noise signal may be generated by an external circuit and inputted to the absolute value calculator 12.

In the preferred embodiment stated above, the random noise signal is generated by the random noise generator circuit 11. However, the present invention is not limited to this. A band signal having a predetermined bandwidth, e.g., one of various signals such as a data signal and an audio signal, or a modulation signal thereof may be a employed instead of the random noise signal.

Second Preferred Embodiment

Figure 12:
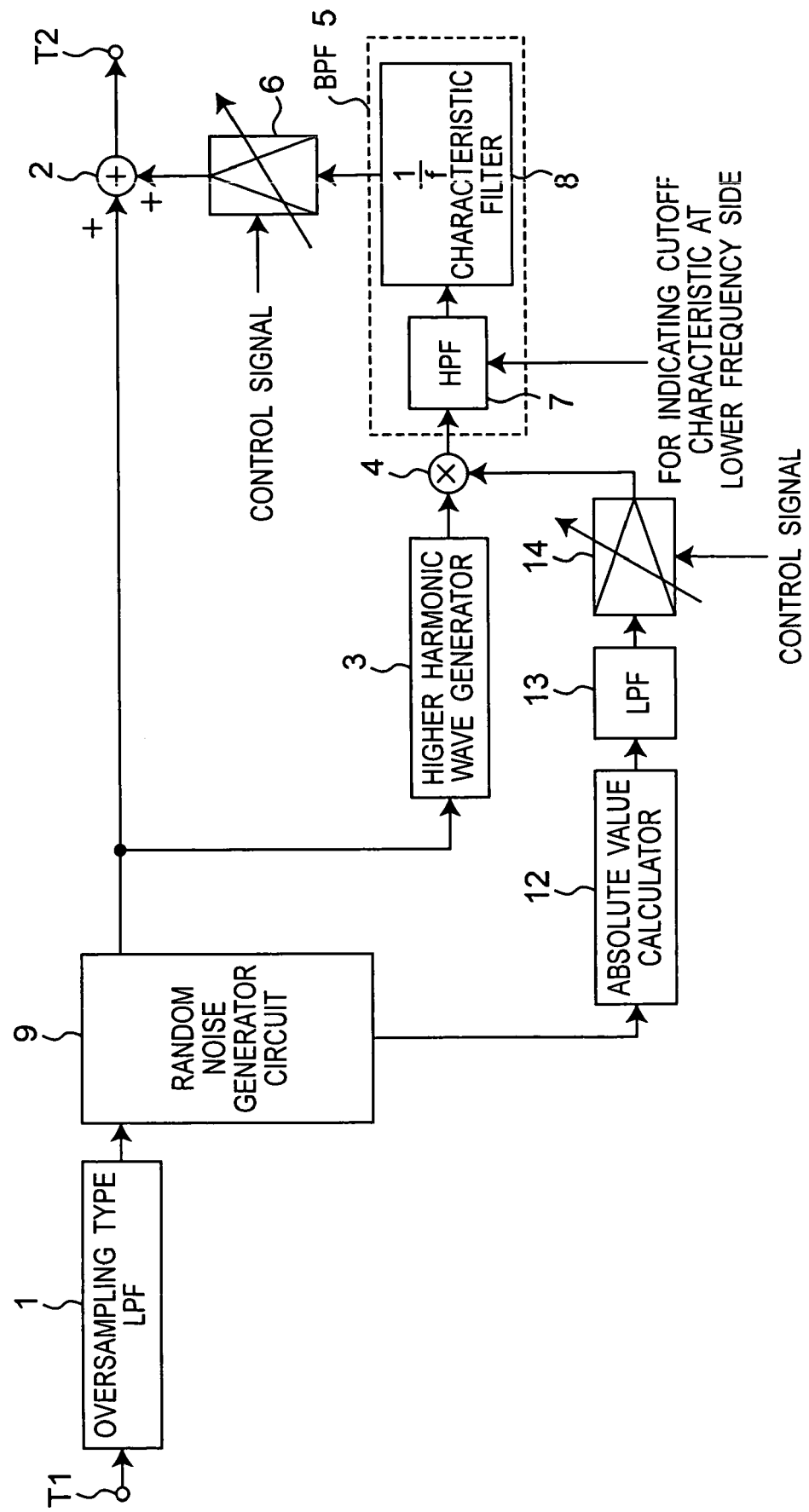
FIG. 12 is a block diagram showing a configuration of an apparatus for extending a band of an audio signal according to a second preferred embodiment of the present invention.

FIG. 12 is a block diagram showing a configuration of an apparatus for extending a band of an audio signal according to a second preferred embodiment of the present invention. The audio signal band extending apparatus according to this second preferred embodiment is characterized, as compared with the audio signal band extending apparatus shown in FIG. 1, by including a random noise generator circuit 9 that generates a random noise signal based on a digital audio signal from an oversampling type low-pass filter 1 instead of the random noise generator circuit 11 that generates a noise signal having no correlation with an original sound. This difference will now be described in detail.

Referring to FIG. 12, the random noise generator circuit 9 executes a primary delta-sigma modulation (a Δ-Σ modulation) processing on the digital audio signal from the oversampling type low-pass filter 1 so as to generate the random noise signal, and outputs the random noise signal to an absolute value calculator 12. In addition, the random noise generator circuit 9 outputs the digital audio signal from the oversampling type low-pass filter 1 as it is or a re-quantized digital audio signal (having a decreased quantization number after re-quantization) to an adder 2.

Figure 13:
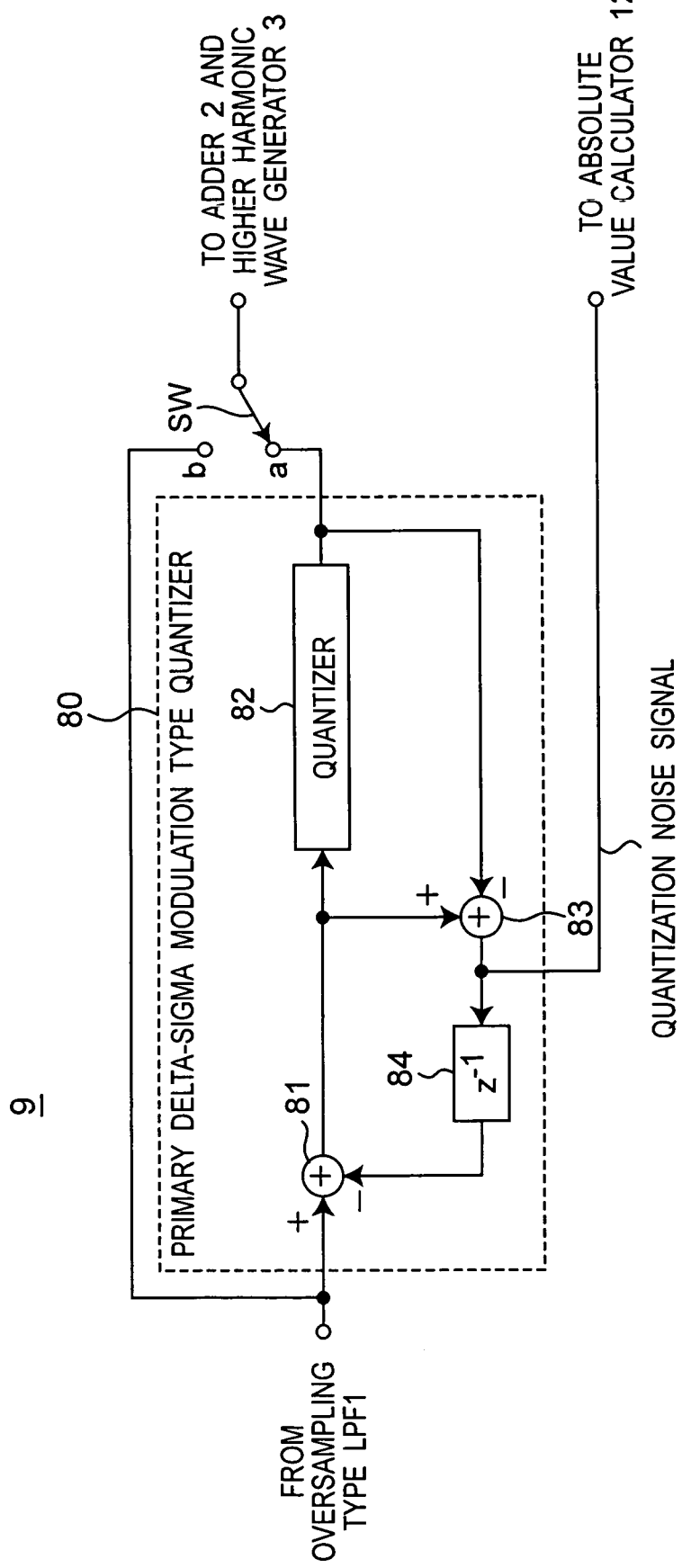
FIG. 13 is a block diagram showing an internal configuration of a random noise generator circuit 9 shown in FIG. 12.

FIG. 13 is a block diagram showing an internal configuration of the random noise generator circuit 9 shown in FIG. 12. Referring to FIG. 13, the random noise generator circuit 9 is constituted by including a primary delta-sigma modulation type quantizer 80 and one switch SW. In this case, the primary delta-sigma modulation type quantizer 80 is constituted by including a subtracter 81, a quantizer 82 that performs re-quantization, a subtracter 83, and a delay circuit 84 that delays a signal by one sample.

The digital audio signal from the oversampling type low-pass filter 1 is outputted to the adder 2 and a higher harmonic wave generator 3 via a contact "b" of the switch SW as it is, and also outputted to the subtracter 81. Next, the subtracter 81 subtracts a digital audio signal from the delay circuit 84, from the digital audio signal from the oversampling type low-pass filter 1 to obtain a digital audio signal having a subtraction result, and outputs the digital audio signal to the quantizer 82 and the subtracter 83. Then, the quantizer 82 re-quantizes an inputted digital audio signal, outputs a delta-sigma modulated signal, which is the re-quantized digital audio signal, to the subtracter 83, and also to the adder 2 and the higher harmonic wave generator 3 via the contact "a" of the switch SW. Further, the subtracter 83 subtracts the delta-sigma modulated signal from the quantizer 82, from a digital audio signal from the subtracter 81 to obtain a quantization noise signal which is a digital audio signal having a subtraction result (and which is generated during the quantization), and outputs the quantization noise signal to the absolute value calculator 12 and also to the subtracter 81 via the delay circuit 84.

In the random noise generator circuit 9 shown in FIG. 13, when the switch SW is switched over to the contact "a" thereof, a digital audio signal (which is a signal having the decreased quantization number) generated by further re-quantizing a digital audio signal quantized by the oversampling type low-pass filter 1 is outputted to the adder 2 and the higher harmonic wave generator 3. Following this, it is possible to output a digital audio signal from an output terminal T2 of the audio signal band extending apparatus with the number of bits of the digital audio signal decreased, and to make circuit size or calculation scale of subsequent signal processing means small. On the other hand, when the switch SW is switched over to the contact "b" thereof, the digital audio signal quantized by the oversampling type low-pass filter 1 is outputted to the adder 2 and the higher harmonic wave generator 3 as it is. Following this, it is possible to output a digital audio signal from the output terminal T2 of the audio signal band extending apparatus without decreasing the number of bits thereof, i.e., it is possible to output the digital audio signal from the oversampling type low-pass filter 1 with the number of bits thereof as it is.

In the random noise generator circuit 9 constituted as described so far, a modulated signal which has been subjected to the primary delta-sigma modulation based on the digital audio signal from the oversampling type low-pass filter 1, i.e., a noise signal that is a band signal generated based on the digital audio signal of the original sound is generated. On the other hand, a band-extended signal is generated by modulating the amplitude the a carrier wave, which is a digital signal of the generated higher harmonic wave component which is generated according to a higher frequency spectral intensity of an inputted digital audio signal in accordance with a noise signal based on the inputted digital audio signal. Then, the band-extended signal is added to the inputted digital audio signal. Accordingly, the present preferred embodiment exhibits not only the functions and advantageous effects according to the first preferred embodiment but also such a characteristic advantageous effect that the higher frequency component of the band-extended signal sounds not artificial but natural relative to the original sound since the noise signal is also generated based on the digital audio signal of the original sound.

In the second preferred embodiment described above, the primary delta-sigma modulation type quantizer 80 is employed. However, the present invention is not limited to this. A plurality of orders of delta-sigma modulation type quantizers may be employed.

In the second preferred embodiment described above, the delta-sigma modulation type quantizer 80 is employed. However, the present invention is not limited to this. A sigma-delta modulation type quantizer that subjects the inputted audio signal to a sigma-delta modulation may be employed.

Third Preferred Embodiment

Figure 14:
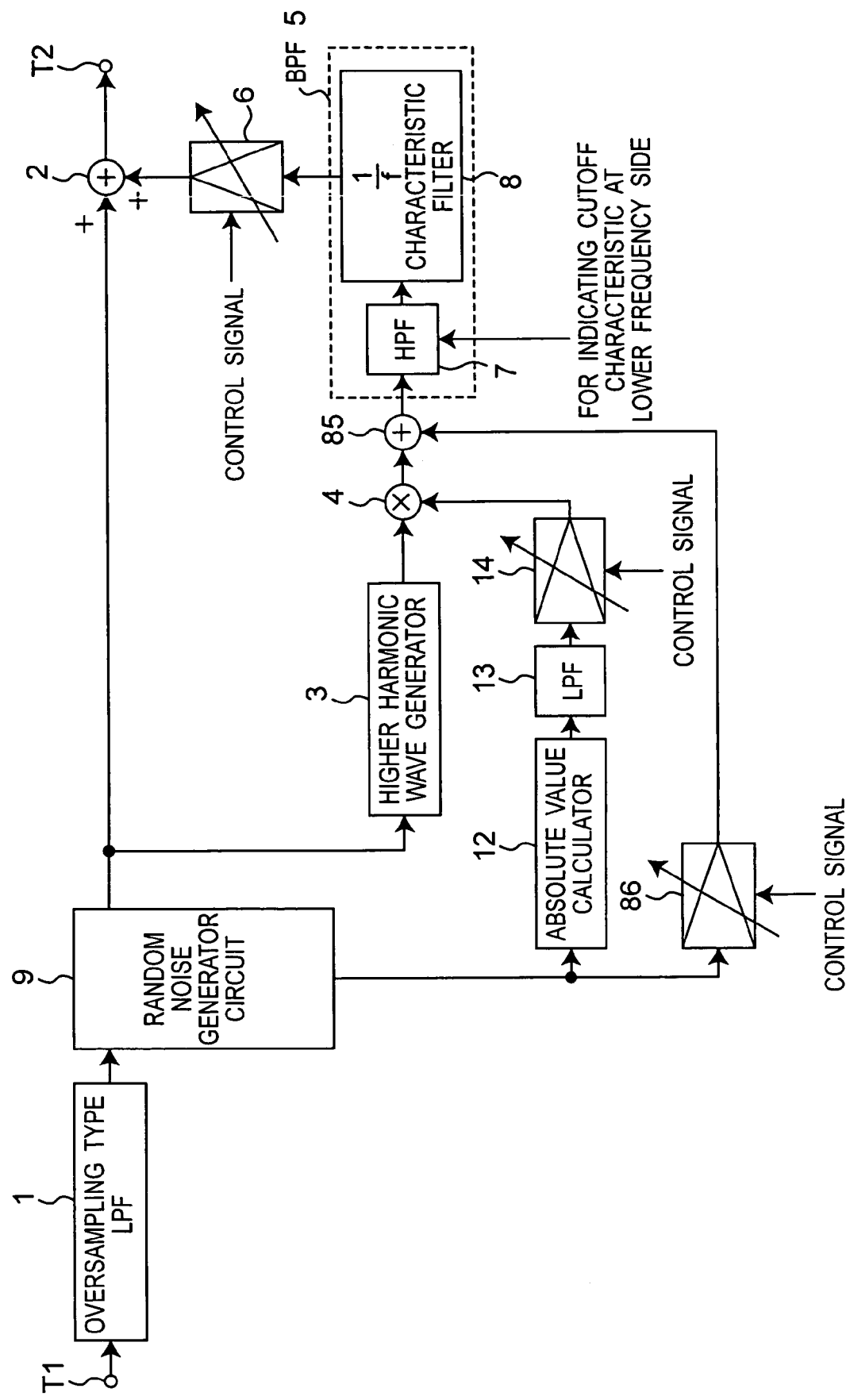
FIG. 14 is a block diagram showing a configuration of an apparatus for extending a band of an audio signal according to a third preferred embodiment of the present invention.

FIG. 14 is a block diagram showing a configuration of an apparatus for extending a band of an audio signal according to a third preferred embodiment of the present invention. The audio signal band extending apparatus according to this third preferred embodiment is characterized, as compared with the audio signal band extending apparatus shown in FIG. 12, by further including a variable amplifier 86 and an adder 85. The difference will now be described.

Referring to FIG. 14, a random noise signal from a random noise generator circuit 9 is outputted to the adder 85 via the variable amplifier 86. The adder 85, which is inserted between a multiplier 4 and a high-pass filter 7, adds a digital signal outputted from the multiplier 4 to a digital signal from the variable amplifier 86, and outputs a digital signal having an addition result to the high-pass filter 7.

In this case, the variable amplifier 86 is a level control circuit. The variable amplifier 86 changes a level (amplitude value) of an inputted digital signal by an amplification ratio (which is set for a positive amplification processing but may be set for a negative amplification or an attenuation processing) based on a control signal, and outputs a level-changed digital signal to the multiplier 4. The variable amplifier 86 is used to adjust a level of digital signal of a random noise obtained by the random noise generator circuit 9, so as to add the digital signal of the random noise to a digital signal having an addition result of adding a digital audio signal from the higher harmonic wave generator 3 and a level of a noise signal from a low-pass filter 13, on such a condition that the random noise has a smaller base than a level of the digital signal having the addition result. This adjustment is preferably set so that the level of the digital signal of the random noise which is to be added to the digital signal from the multiplier 4 is, for example, about 10% to 50% of that of the digital signal from the multiplier 4.

Accordingly, the present preferred embodiment exhibits not only the functions and advantageous effects of the second preferred embodiment but also a characteristic advantageous effect that the higher frequency component of a band-extended signal sounds more natural relative to the original sound since the digital signal of the random noise that becomes a base signal for the band-extended signal according to the second preferred embodiment and a frequency spectrum becomes more continuous relative to frequencies.

Fourth Preferred Embodiment

Figure 15:
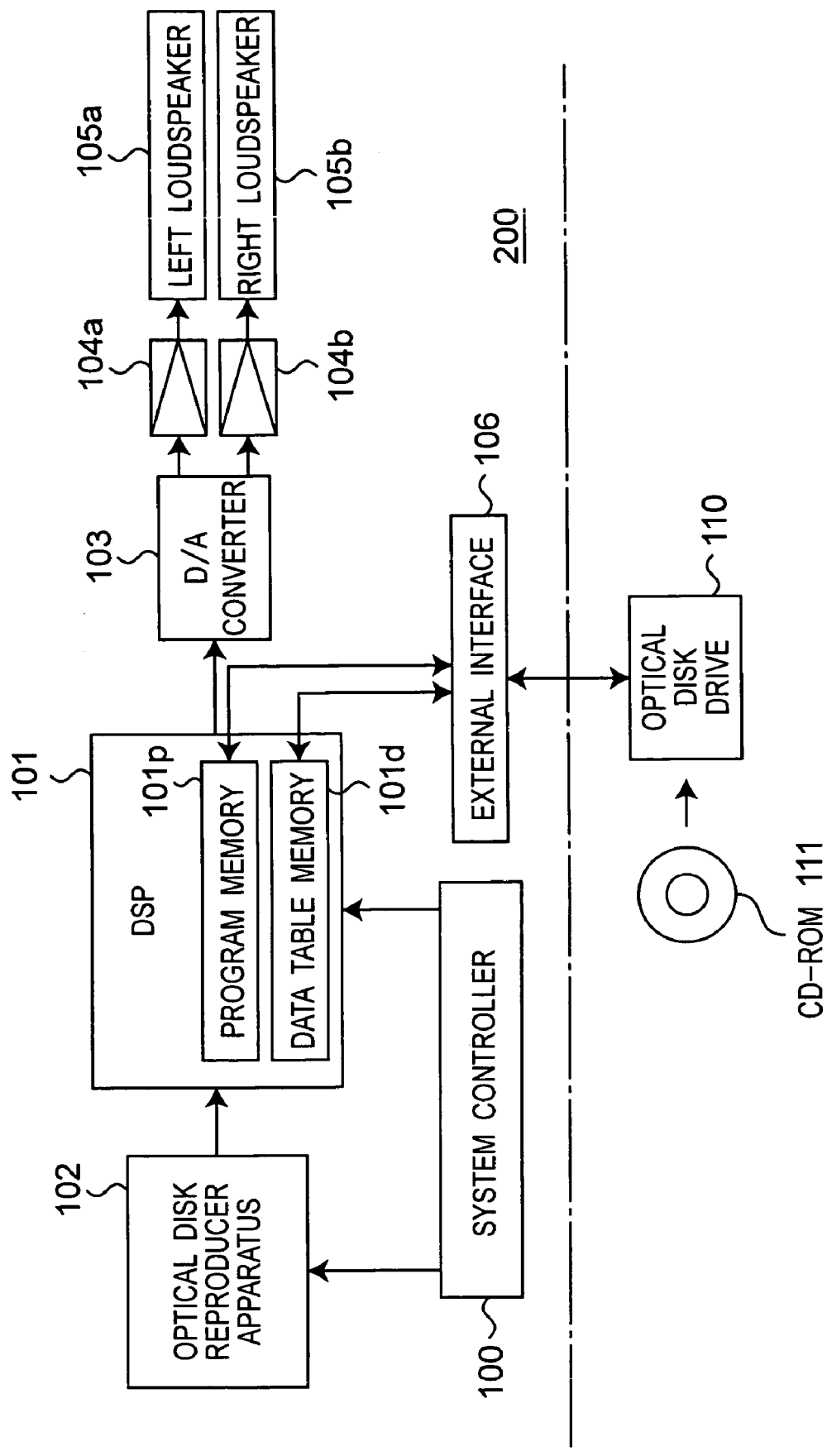
FIG. 15 is a block diagram showing a configuration of an optical disk reproduction system which is one example of an application of an apparatus for extending a band of an audio signal according to a fourth preferred embodiment of the present invention.

FIG. 15 is a block diagram showing a configuration of an optical disk reproduction system which is one example of an application of an apparatus for extending a band of an audio signal, according to a fourth preferred embodiment of the present invention.

In the first, second or third preferred embodiment described above, the audio signal band extending apparatus is constituted by hardware or the digital signal processing circuit. However, the present invention is not limited to this. For example, the respective processing steps in the configuration shown in FIG. 1, 12 or 14 may be realized by a signal processing program for extending a band of an audio signal. In addition, the signal processing program may be stored in a program memory 101p of a digital signal processor (referred to as a DSP hereinafter) 101 shown in FIG. 15 and executed by the DSP 101. It is noted that a data table memory 101d of the DSP 101 stores various kinds of data necessary to execute the signal processing program.

Referring to FIG. 15, an optical disk reproducer apparatus 102 is an apparatus for reproducing a content of an optical disk, for example, a DVD player, a CD player, or an MD player. The DSP 101 executes the signal processing program for left and right digital audio signals reproduced by the optical disk reproducer apparatus 102, and digital audio signals which are band-extended from an inputted digital audio signals are obtained and outputted to a D/A converter 103. Next, the D/A converter 103 converts an inputted digital audio signals into analog audio signals, and outputs the analog audio signals to left and right loudspeakers 105a and 105b via power amplifiers 104a and 104b, respectively. In this case, a system controller 100 controls an overall operation of the optical disk reproduction system and particularly controls operations of the optical disk reproducer apparatus 102 and the DSP 101. In addition, the program memory 101p and the data table memory 101d of the DSP 101 are constituted by nonvolatile memories such as flash memories or EEPROMs.

In FIGS. 1, 12, and 14, a command signal to the high-pass filter 7 and a control signal to the variable amplifier 14 are generated and inputted by, for example, the system controller 100, so that operations of these apparatuses or system can be controlled.

In the optical disk system constituted as described so far, digital audio signals reproduced by the optical disk reproducer apparatus 102 can be appropriately band-extended by the DSP 101 and then reproduced by the left and right loudspeakers 105a and 105b, respectively.

As described so far, according to the present preferred embodiment, the respective processing steps in the configuration shown in FIG. 1, 12 or 14 are realized by the signal processing program for extending the band of the audio signal, and the signal processing program is executed by the DSP 101 shown in FIG. 15. Accordingly, it is possible to easily upgrade versions for adding functions of the signal processing program and for debugging.

In the present preferred embodiment, the signal processing program and data for executing the program may be stored in the program memory 101p and the data table memory 101d, respectively, in advance during a manufacturing process. Alternatively, as shown below, the signal processing program and the data for executing the program which are recorded in a computer readable recording medium such as a CD-ROM 111 may be reproduced by an optical disk drive 110 including a controller such as a computer or the like, and the reproduced program and data may be stored in the program memory 101p and the data table memory 101d within the DSP 101, respectively, via an external interface 106.

In the present preferred embodiment, the DSP 101 is employed. However, the present invention is not limited to this, and a controller for a digital calculator such as a micro processor unit (MPU) may be employed.

INDUSTRIAL APPLICABILITY

As described so far in detail, according to the method or apparatus for extending the band of the audio signal according to the present invention, a higher harmonic wave of an inputted audio signal having a predetermined band is generated based on the inputted audio signal. An amplitude of a generated higher harmonic wave of the audio signal is modulated according to a band signal having a predetermined bandwidth so as to generate an amplitude-modulated signal. A generated amplitude-modulated signal is bandpass-filtered using a predetermined bandpass characteristic and outputted. A bandpass-filtered amplitude-modulated signal is added to the inputted audio signal, and an audio signal having an addition result is outputted. Therefore, according to the method or apparatus for extending the band of the audio signal according to the present invention, a band-extended signal, which is obtained by modulating an amplitude of a carrier wave that is the higher harmonic wave of the inputted audio signal according to the band signal, is added to the inputted audio signal. Accordingly, It is possible to easily generate an audio signal having an extended audio band as compared with the prior art. In addition, the band-extended signal obtained by the amplitude modulation changes according to a level of an original sound and keeps its spectral continuity. Accordingly, the method or apparatus according to the present invention has such a advantageous effect that the higher frequency component of the band-extended signal sounds not artificial but natural relative to the original sound.

The invention claimed is:

1. A method for extending a band of an audio signal inputted into a band extending apparatus, said method including the steps of:
   responsive to the inputted audio signal having a predetermined band, generating, with a higher harmonic wave generating device, a higher harmonic wave of the inputted audio signal;
   generating a first modulated signal by modulating, with a modulator, an amplitude of a generated higher harmonic wave of the audio signal according to a band signal having a predetermined bandwidth;
   bandpass-filtering, with a band pass filter, a generated first modulated signal using a predetermined bandpass characteristic and outputting a resultant first modulated signal; and
   adding, with an adding device, a bandpass-filtered first modulated signal to the inputted audio signal, and outputting an audio signal having an addition result.

2. The method as claimed in claim 1, further including a step of changing, with a first level changing device, a level of the band signal, prior to said amplitude modulating step.

3. The method as claimed in claim 1, further including a step of changing, with a second level changing device, a level of the bandpass-filtered first modulated signal, prior to said adding step.

4. The method as claimed in claim 1, further including a step of changing, with a level changing device, a level of the inputted audio signal, adding the audio signal having a changed level to the first modulated signal, and outputting a resultant first modulated signal to said bandpass-filtering step, said level changing step executed after said amplitude modulating step and prior to said bandpass-filtering step.

5. The method as claimed in claim 1, further including a step of generating, with a band generating device, the band signal.

6. The method as claimed in claim 5,
wherein said band signal generating step includes a step of generating, with the band generating device, a noise signal having no correlation with the inputted audio signal.

7. The method as claimed in claim 5,
wherein said band signal generating step includes a step of generating, with the band generating device, the band signal based on the inputted audio signal.

8. The method as claimed in claim 6,
wherein said band signal generating step includes the steps of:
generating, with a random noise generator, a predetermined random noise signal;
calculating, with an absolute value generator, an absolute value of a generated random noise signal, and generating a random noise signal having the absolute value; and
low-pass filtering, with a low pass filter, the random noise signal having the absolute value using a predetermined low-pass characteristic, and outputting a resultant random noise signal as the band signal.

9. The method as claimed in claim 7,
wherein said band signal generating step includes the steps of:
generating a second modulated signal by quantizing the inputted audio signal using either one of a delta-sigma modulation type quantizer and a sigma-delta modulation type quantizer, and generating a quantization noise signal during said quantization;
calculating, with an absolute value generator, an absolute value of a generated quantization noise signal, and generating a random noise signal having the absolute value; and
low-pass filtering, with a low pass filter, the random noise signal having the absolute value using a predetermined low-pass characteristic, and outputting a resultant random noise signal as the band signal.

10. The method as claimed in claim 9,
wherein said adding step includes a step of adding, with the adding device, an audio signal generated by quantizing the inputted audio signal, instead of the inputted audio signal, to the bandpass-filtered first modulated signal, and outputting an audio signal having an addition result.

11. The method as claimed in claim 1, further including a step of changing, with a cutoff characteristic changing device, a cutoff characteristic on a lower frequency side of the bandpass characteristic.

12. An apparatus for extending a band of an audio signal, said apparatus comprising:
a higher harmonic wave generating device for generating a higher harmonic wave of an inputted audio signal having a predetermined band based on the inputted audio signal;
an amplitude modulating device for generating a first modulated signal by modulating an amplitude of a generated higher harmonic wave of the audio signal according to a band signal having a predetermined bandwidth;
a bandpass filtering device for bandpass-filtering a generated first modulated signal using a predetermined bandpass characteristic, and for outputting a resultant first modulated signal; and
an adding device for adding a bandpass-filtered first modulated signal to the inputted audio signal, and for outputting an audio signal having an addition result.

13. The apparatus as claimed in claim 12, further comprising a first level changing device provided at the previous stage of said amplitude modulating device, said first level changing device changing a level of the band signal.

14. The apparatus as claimed in claim 12, further comprising a second level changing device provided at the previous stage of said adding device, said second level changing device changing a level of the bandpass-filtered first modulated signal.

15. The apparatus as claimed in claim 12, further comprising a level changing device provided at the subsequent stage of said amplitude modulating device and at the previous stage of said bandpass-filtering device, said level changing device changing a level of the inputted audio signal, adding the audio signal having a changed level to the first modulated signal, and bandpass-filtering a resultant first modulated signal.

16. The apparatus as claimed in claim 12, further comprising a band signal generating device for generating the band signal.

17. The apparatus as claimed in claim 16,
wherein said band signal generating device generates a noise signal having no correlation to the inputted audio signal.

18. The apparatus as claimed in claim 16,
wherein said band signal generating device generates the band signal based on the inputted audio signal.

19. The apparatus as claimed in claim 17,
wherein said band signal generating device includes:
a device for generating a predetermined random noise signal;
a device for calculating an absolute value of a generated random noise signal, and generating a random noise signal having the absolute value; and
a device for low-pass filtering the random noise signal having the absolute value using a predetermined low-pass characteristic, and outputting a resultant random noise signal as the band signal.

20. The apparatus as claimed in claim 18,
wherein said band signal generating device includes:
a device for quantizing the inputted audio signal using either one of a delta-sigma modulation type quantizer and a sigma-delta modulation type quantizer to generate a second modulated signal, and for generating a quantization noise signal during said quantization;
a device for calculating an absolute value of a generated quantization noise signal, and generating a random noise signal having the absolute value; and
a device for low-pass filtering the random noise signal having the absolute value using a predetermined low-pass characteristic, and outputting a resultant random noise signal as the band signal.

21. The apparatus as claimed in claim 20,
wherein said adding device adds an audio signal generated by quantizing the inputted audio signal, instead of the inputted audio signal, to the bandpass-filtered first modulated signal, and outputs an audio signal having an addition result.

22. The apparatus as claimed in claim 12, further comprising a device for changing a cutoff characteristic on a lower frequency side of the bandpass characteristic of said bandpass-filtering device.

23. A computer readable recording medium having a computer program stored thereon for causing a computer to perform a method comprising:

responsive to an inputted audio signal having a predetermined band, generating a higher harmonic wave of the inputted audio signal;

generating a first modulated signal by modulating an amplitude of a generated higher harmonic wave of the audio signal according to a band signal having a predetermined bandwidth;

bandpass-filtering a generated first modulated signal using a predetermined bandpass characteristic and outputting a resultant first modulated signal; and adding a bandpass-filtered first modulated signal to the inputted audio signal, and outputting an audio signal having an addition result.

* * * * *